United States Patent
Milne (10) Patent No.: US 8,159,365 B2
(45) Date of Patent: Apr. 17, 2012

(54) DISTRIBUTED DATABASES FOR A WELL CONTROL DRILLING SYSTEM

(75) Inventor: Eric Lee Milne, Pearland, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 1036 days.

(21) Appl. No.: 12/103,852

(22) Filed: Apr. 16, 2008

(65) Prior Publication Data

US 2009/0265395 A1    Oct. 22, 2009

(51) Int. Cl.
*E21B 47/00* (2012.01)
*G06F 17/30* (2006.01)

(52) U.S. Cl. ............ 340/853.1; 175/40; 700/282

(58) Field of Classification Search .......... 137/551, 137/554; 340/853.1; 175/40; 700/292
See application file for complete search history.

(56) References Cited

U.S. PATENT DOCUMENTS

| 4,617,960 A * | 10/1986 | More ........................ 137/554 |
| 5,202,680 A * | 4/1993 | Savage ..................... 340/853.1 |
| 6,422,315 B1 | 7/2002 | Dean |
| 2005/0236155 A1 | 10/2005 | Killie et al. |
| 2006/0212134 A1 | 9/2006 | Dhawan |

FOREIGN PATENT DOCUMENTS

GB    2211222 A    6/1989

OTHER PUBLICATIONS

International Search Report for PCT/US2009/036721 mailed Jul. 14, 2009.

* cited by examiner

*Primary Examiner* — John Rivell
(74) *Attorney, Agent, or Firm* — Potomac Patent Group PLLC (57) ABSTRACT

An apparatus to update data in a well control system includes a central control unit in communication with a communications network, the central control unit comprising a first display database, an end device in communication with the communications network, the end device comprising a local hardware database, and an operator's panel in communication with the communications network, the operator's panel comprising a second display database, wherein the local hardware database is configured to automatically update data to a primary display database designated from one of the first and the second display databases, wherein the primary display database is configured to automatically update the data to the other of the first and the second display databases.

17 Claims, 9 Drawing Sheets

DISTRIBUTED DATABASES FOR A WELL CONTROL DRILLING SYSTEM

BACKGROUND

Well control is an important aspect of oil and gas exploration. When drilling a well in, for example, oil and gas exploration applications, devices must be put in place to prevent injury to personnel and equipment associated with the drilling activities. One such well control device is known as a blowout preventer (BOP).

Blowout preventers are generally used to seal a wellbore. For example, drilling wells in oil or gas exploration involves penetrating a variety of subsurface geologic structures, or "layers." Each layer generally comprises a specific geologic composition such as, for example, shale, sandstone, limestone, etc. Each layer may contain trapped fluids or gas at different formation pressures, and the formation pressures increase with increasing depth. The pressure in the wellbore is generally adjusted to at least balance the formation pressure by, for example, increasing a density of drilling mud in the wellbore or increasing pump pressure at the surface of the well.

There are occasions during drilling operations when a wellbore may penetrate a layer having a formation pressure substantially higher than the pressure maintained in the wellbore. When this occurs, the well is said to have "taken a kick." The pressure increase associated with the kick is generally produced by an influx of formation fluids (which may be a liquid, a gas, or a combination thereof) into the wellbore. The relatively high pressure kick tends to propagate from a point of entry in the wellbore uphole (from a high pressure region to a low pressure region). If the kick is allowed to reach the surface, drilling fluid, well tools, and other drilling structures may be blown out of the wellbore. These "blowouts" may result in catastrophic destruction of the drilling equipment (including, for example, the drilling rig) and in injury of rig personnel.

Because of the risk of blowouts, blowout preventers are typically installed at the surface or on the sea floor in deep water drilling arrangements so that kicks may be adequately controlled and "circulated out" of the system. Blowout preventers may be activated to effectively seal in a wellbore until active measures can be taken to control the kick. There are several types of blowout preventers, the most common of which are annular blowout preventers and ram-type blowout preventers.

Annular blowout preventers typically comprise annular elastomer "packers" that may be activated (e.g., inflated) to encapsulate drill pipe and well tools and completely seal the wellbore. A second type of the blowout preventer is the ram-type blowout preventer. Ram-type preventers typically comprise a body and at least two oppositely disposed bonnets. The bonnets are generally secured to the body about their circumference with, for example, bolts. Alternatively, bonnets may be secured to the body with a hinge and bolts so that the bonnet may be rotated to the side for maintenance access.

Interior of each bonnet contains a piston actuated ram. The functionality of the rams may include pipe rams, shear rams, or blind rams. Pipe rams (including variable bore rams) engage and seal around the drill pipe or well tool left in the wellbore, leaving the engaged objects intact. In contrast, shear rams engage and physically shear the drill pipe or well tools left in the wellbore. Similarly, blind rams engage each other and seal off the wellbore when no drill pipe or well tools are in the wellbore. The rams are typically located opposite of each other and, whether pipe rams, shear rams, or blind rams, the rams typically seal against one another proximate a center of the wellbore in order to seal the wellbore.

As such, many oil and gas bearing formations lie beneath large bodies of water. Producing wells extending into these formations are equipped with subsea wellheads and other underwater installations which rest at the ocean or sea floor. As such, it is customary to provide blowout protection and other related functions during subsea drilling operations. As such subsea blowout preventer installations may be equipped with numerous and varied types of valves, rams, and other operating controls that may be hydraulically, electro-mechanically, or electro-hydraulically operated to control wellbore fluids.

In shallow water, many subsea blowout preventer and flow control installations are controlled hydraulically. These all-hydraulic systems may include a bundle of hydraulic hoses and control lines extending between the surface and subsea facilities. Alternatively, individual hoses may supply hydraulic power from the surface to the subsea installation to monitor the status of the subsea equipment and perform control operations. Advantageously, these systems are simple, reliable, and inexpensive for relatively short hose lengths (i.e., water depths) although response time may be slow. However, in deep-water installations, the response time for a hydraulic system increases and its reliability decreases.

In response to the demands of deep-water subsea environments, electro-hydraulic systems were introduced to improve the performance of traditional hydraulic systems in deep water or over long distances. As such, an electro-hydraulic subsea control cable may employ a multiplex (MUX) hose in which several hydraulic control signals may be multiplexed (e.g., through digital time division) and transmitted. The multitude of signals may then be separated out at the end of the multiplex hose and used to manipulate valves in a control pod of a blowout preventer or another subsea component. While a multiplex umbilical line may be a hydraulic hose, it should be understood that an electrical line may also serve as a multiplexing conduit.

Figure 1:
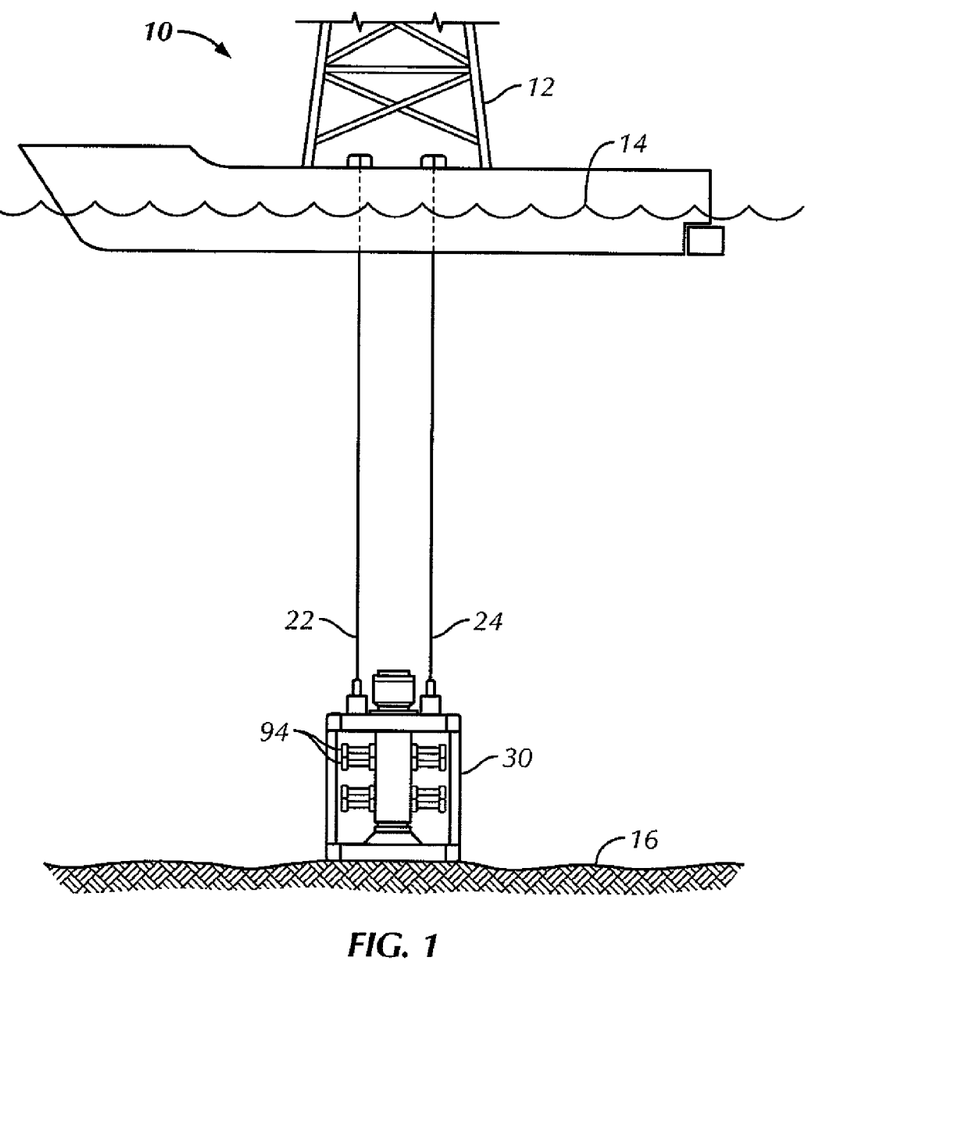
FIG. 1 shows a prior art oil drilling unit.

Referring initially to FIG. 1, an example of an offshore drilling unit 10 taken from U.S. Pat. No. 6,484,806, issued to Childers et al., and incorporated by reference in its entirety is shown. Drilling unit 10 includes a floating drilling rig 12 in water 14 capable of drilling a well into a sea floor 16. Drilling unit 10 is shown connected to a BOP stack 30 having a plurality of ram BOP actuators 94 through a pair of umbilical cables 22 and 24. As such, electro-hydraulic systems controlling blowout preventers through hoses require a control system.

As such, it may be desirable to archive control system data in a database for future use or analysis. Particularly, it is desirable for any process control system to have data storage device, such as a database, in a remote location. Such systems may need to update and/or store information remotely for either archival purposes or for retrieval from another remote system.

Typical well control systems encompass local well control applications that monitor sensors or control hardware in conjunction with the control of a blowout preventer. Updates of sensor readings and commands have to be sent by the local applications via a communications network to a master database that is located somewhere in the system. The master database then propagates the new values throughout the system. Thus, the local application has to identify the location of the master database at all times, and one local application may be responsible for updating all processor nodes or platforms in the system itself. This leads to unnecessary overhead and is highly inefficient.

As subsea well drilling is performed in what would be considered to be a harsh environment, numerous threats exist that endanger subsea equipment. Therefore, it is desirable for subsea equipment and systems to be resilient and functional despite these threats. One way to achieve this functionality is to separate databases into logical groupings and distributing them throughout the control system.

SUMMARY

In one aspect, the present disclosure relates to an apparatus to update data in a well control system including a central control unit in communication with a communications network, the central control unit comprising a first display database, an end device in communication with the communications network, the end device comprising a local hardware database, and an operator's panel in communication with the communications network, the operator's panel comprising a second display database, wherein the local hardware database is configured to automatically update data to a primary display database designated from one of the first and the second display databases, wherein the primary display database is configured to automatically update the data to the other of the first and the second display databases.

Other aspects and advantages of the invention will be apparent from the following detailed description and the appended claims.

DETAILED DESCRIPTION

Specific embodiments of the present disclosure will now be described in detail with reference to the accompanying Figures. Like elements in the various Figures are denoted by like reference numerals for consistency.

In the following detailed description of one or more embodiments, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the present disclosure relate to methods and systems for separating databases into logical groupings and distributing them throughout a well control drilling system. More specifically, embodiments of the present disclosure provide distribution of a local hardware database to each end device and operator's panel of the control system.

Figure 2:
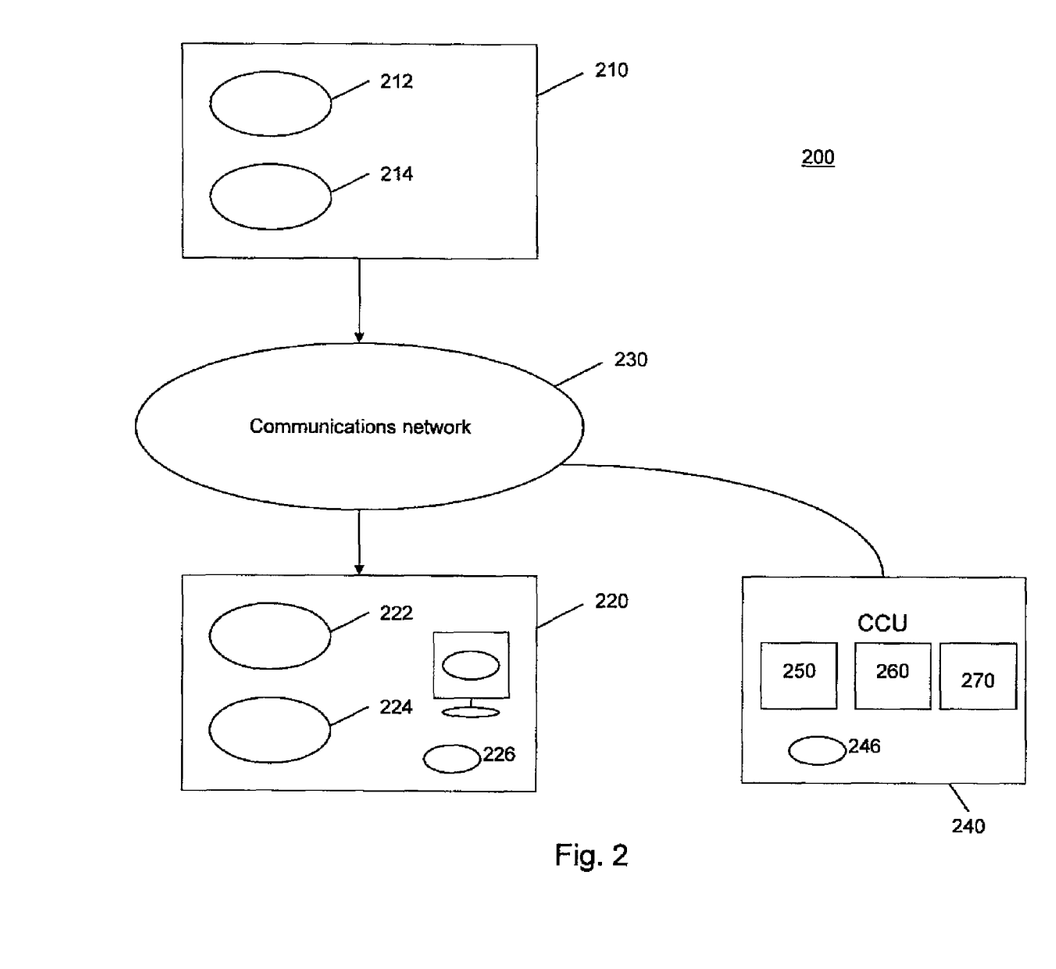
FIG. 2 shows a database system in accordance with an embodiment of the present disclosure.

FIG. 2 shows a system 200 for updating data from a local location that includes an end device 210 including a local hardware database 212 and a local application 214. The local hardware database 212 is specific to the local application 214 and the end device 210. It should be understood that end device 210 may be any device known to one of ordinary skill in the art including, but not limited to, a subsea electronics module ("SEM") of a subsea pod, a hydraulic pumping unit, and a diverter. The end device 210 may be part of a process control system such as a well control drilling system that controls a blowout preventer (BOP) and that measures, updates, and stores data remotely. Furthermore, end device 210 may receive blowout preventer data from another source, such as from a device connected through a communication network 230.

In one example of operation, the local application 214 executing on the end device 210 reads new data such as measurement values from sensors or any other measurable or recordable information. The local application 214 then updates the local hardware database 212 with the new data. In another embodiment, the local application 214 checks the local hardware database 212 for new commands to control hardware, e.g., for energizing and de-energizing solenoids.

The system 200 further includes an operator's panel 220. As a person skilled in the art will appreciate, the operator's panel 220 may be a toolpusher's panel or a driller's panel, or any other operator's panel. The operator's panel 220 includes a local operator database 222 and a local operator application 224.

Still referring to FIG. 2, the end device 210 is configured to communicate with the operator's panel 220 through a communications network 230, such as a local area network ("LAN") or a wide area network ("WAN"). Furthermore, as will be understood by the skilled person, the end device 210 and the operator's panel 220 may include more than one local application executing thereon.

The system 200 further includes a central control unit (CCU) 240 including a system controller 250, a communication controller 260, and a utility processor 270. Each of the system controller 250, the communication controller 260, and the utility processor 270, respectively, include a local hardware database and a local application (not shown separately). The central control unit 240 is configured to communicate with the end device 210 and the operator's panel 220 through communications network 230. The person skilled in the art will appreciate that the central control unit 240 may comprise more than one of the system controller 250, the communication controller 260, and the utility processor 270 in order to provide redundancy to the system 200 in case one of the system controller 250, the communication controller 260, and the utility processor 270, respectively, fails, so that the system 200 may continue to be operational.

In the case the central control unit 240 includes a plurality of system controllers 250, the system controllers 250 may perform the same task, but they may nonetheless include different types of processors. For example, system controllers 250 may have different types of hardware and/or software platforms for durability. Particularly, certain events and/or conditions may cause failure in one type of hardware/software platform, but not others. For example, if the central control unit 240 includes two system controllers 250, one system controller may include a WINDOWS platform while the other includes a LINUX platform.

Communication network 230 facilitates communication between components in system 200. The communication between components in system 200 may be in the form of sending and receiving data between the components, wherein the data is a set of measurement values to be updated to the local hardware databases or other data necessary for the functionality of system 200 as, for example, commands. Further, communication network 230 may include any type of communication means, such as a LAN, WAN, Ethernet bus, satellite, cellular, any other type of wired or wireless link, and equivalents thereof.

Furthermore, communication network 230 may comprise a plurality of networks or communication mechanisms. Particularly, two components configured to communicate with each other may communicate through more than one communication mechanism. For example, first and second system controller 250 may be connected to each other through more than one local area network. The plurality of networks may serve as an additional level of redundancy in system 200.

Figure 3:
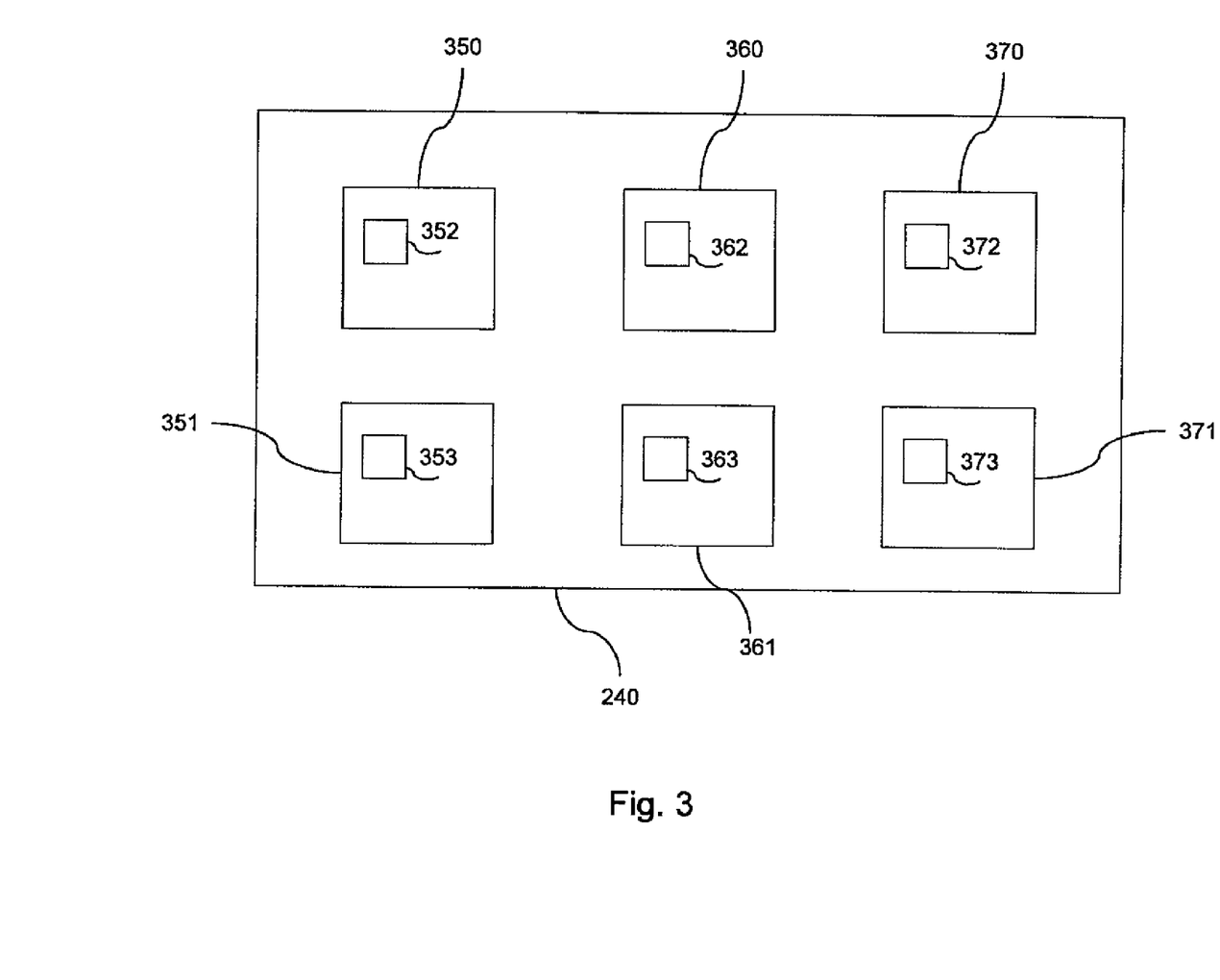
FIG. 3 shows a partial view of an example system in accordance with an embodiment of the present disclosure.

As shown in FIG. 3, the central control unit 240 may include two system controllers 350, 351, two communication controllers 360, 361, and two utility processors 370, 371. One of the system controllers (e.g., 350) includes a primary local system controller database 352, and the other (e.g., 351) includes a replicate local system controller database 353. Similarly, one of the communication controllers (e.g., 360) includes a primary local communication controller database 362, and the other (e.g., 361) includes a replicate local communication controller database 363. One of the utility processors (e.g., 370) includes a primary local utility processor database 372, and the other (e.g., 371) includes a replicate local utility processor database 373.

Each pair of primary/replicate local hardware databases constitutes a remote database. In a case where either of the primary database or replicate database fails, the system as a whole will not fail, due to the redundancy present in the remote database. For example, in a case where the primary database (e.g., 352) fails, the replicate database (e.g., 353) may switch to operate in primary mode, thereby performing the functions of failed database 352. As original primary database 352 and original replicate database 353 have identical sets of data provided by the duplication, no data will be lost in the case of a failure, and the switch will be seamless. Furthermore, when original primary database 352 is restored, the original replicate database 353 may continue to operate in primary mode, thereby updating new entries to original primary database 352, which would now be operating in replicate mode.

Figure 4:
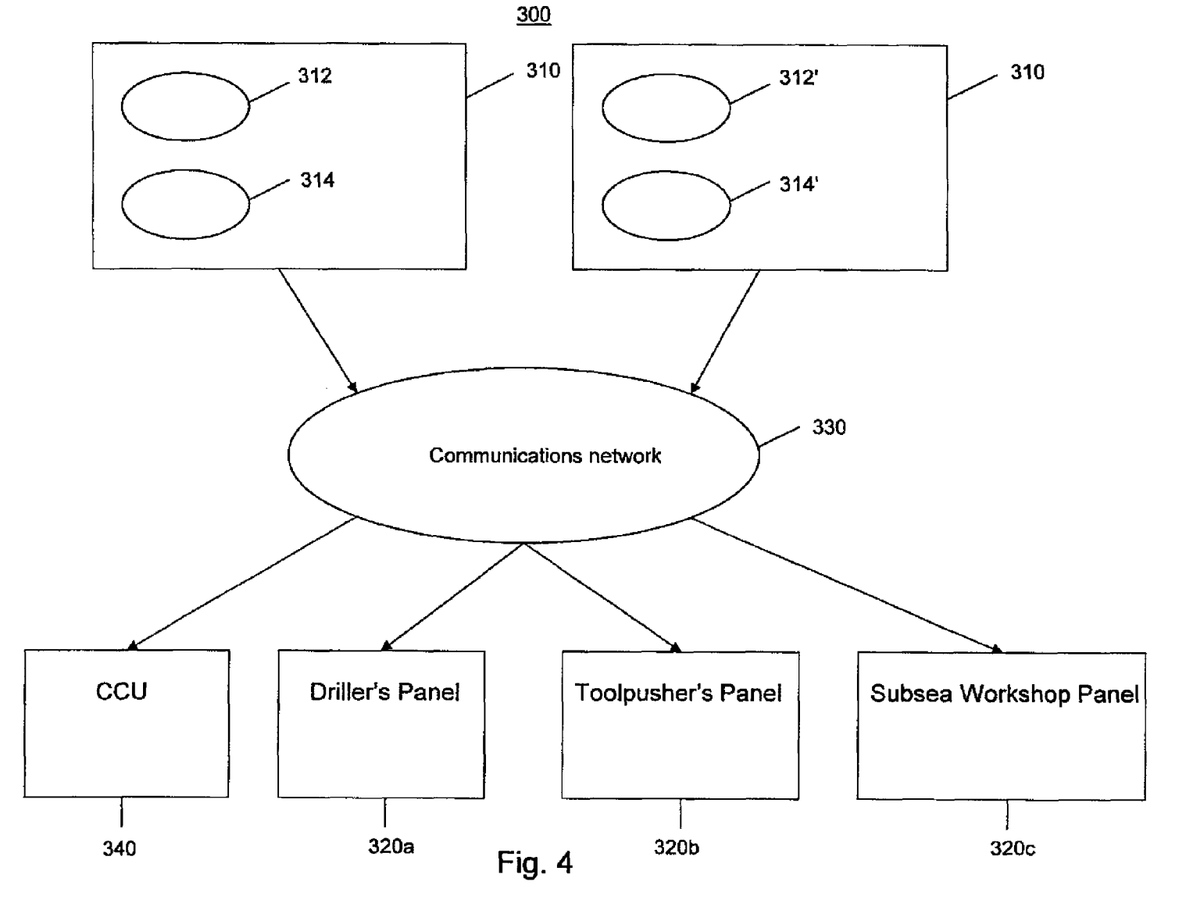
FIG. 4 shows an example system in accordance with an embodiment of the present disclosure.

Referring now to FIG. 4, a system 300 for updating data from a blowout preventer according to one preferred embodiment is shown. System 300 includes a first end device 310 and a second end device 310'. In a manner similar to 210 of FIG. 2, the first and the second end device 310, 310' each include a local hardware database 312, 312' and a local application 314, 314', respectively. System 300 further comprises a central control unit 340 and three operator's panels that are a driller's panel 320a, a toolpusher's panel 320b, and a subsea workshop panel 320c. In a manner similar to 220 in FIG. 2, the driller's panel 320a includes a local driller database and a local driller application (not shown separately), the toolpusher's panel 320b includes a local toolpusher database and a local toolpusher application (not shown separately), and the subsea workshop panel 320c includes a local subsea workshop database and a local subsea workshop application (not shown separately).

The first end device 310 and the second end device 310' are configured to communicate with the central control unit 340 and the operator's panels 320a-320c through a communications network 330, similarly to 230 in FIG. 2. It will be understood by the skilled person that the operator's panels 320a-320c may also communicate with each other and with the central control unit 340 through the communications network 330. In the embodiment shown in FIG. 4, updates of new entries of blowout preventer data are communicated through the communications network 330 from the end devices 310, 310' to the central control unit 340 and the operator's panels 320a-320c. However, it is understood that data may flow in the other direction, i.e., commands may be communicated through the communications system 330 from the operator's panels 320a-320c and the central control unit 340 to the end devices 310, 310'. Furthermore, commands may be sent directly from the operator's panels (e.g., 320a) to the end devices (e.g., 310) without going through the central control unit 340.

While FIG. 4 shows system 300 as having two end devices 310, 310', one skilled in the art will appreciate that any number of end devices may be used. For example, a typical drilling control system includes two subsea pods (e.g., a "yellow" subsea pod and a "blue" subsea pod), a hydraulic pumping unit (HPU), and a diverter. As such, each subsea pod may include a primary and a standby subsea electronics module. The primary and the standby subsea electronics modules each include a local pod database and a local pod application. One of the local pod databases of a pair of primary/standby subsea electronics modules may operate as a primary local pod database, while the other may operate as a replicate local pod database. The local pod applications of the primary and the standby subsea electronics modules each interface the same hardware and sensors, such as transducers or solenoids. However, other end devices may include a hydraulic pumping unit and a diverter. A hydraulic pumping unit may include a local HPU database and a local HPU application, and the diverter may include a local diverter database and a local diverter application.

Thus, in some embodiments, an end device may optionally include a local hardware database as well as a replicate local hardware database (e.g., where end device 310 is a subsea electronics module of a subsea pod), while in other embodiments (e.g., where end device 310 is an HPU or diverter), the replicate local hardware database need not be required. Further, while system 300 is shown as having two end devices 310, 310', one skilled in the art would appreciate that there exists no limitation on the number of end devices 310 that may be present in system 300.

In instances where more than one processor node interfaces the same hardware (sensors, etc.), a primary and a replicate local hardware database are created on the nodes. The replicate local hardware database is a duplicate copy of the primary local hardware database. This is the case, for example, for the primary and the standby subsea electronics modules of the subsea pods. Other examples will be apparent in the following.

Figure 5A:
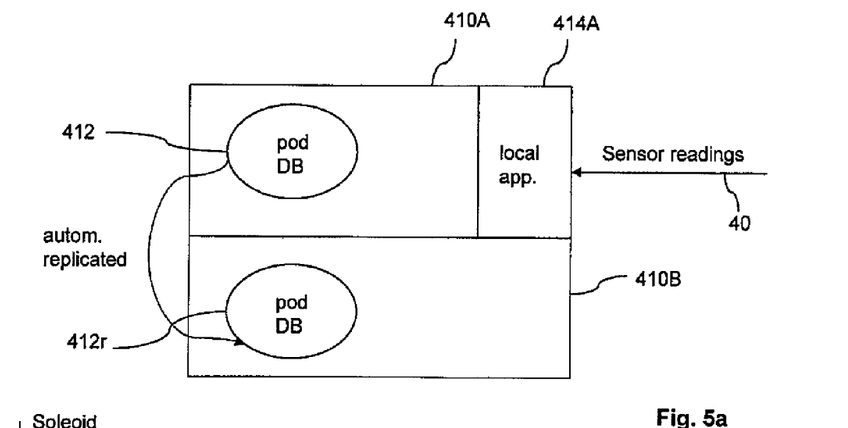
FIGS. 5a and 5b show partial views of an example system in accordance with an embodiment of the present disclosure.
Figure 5B:
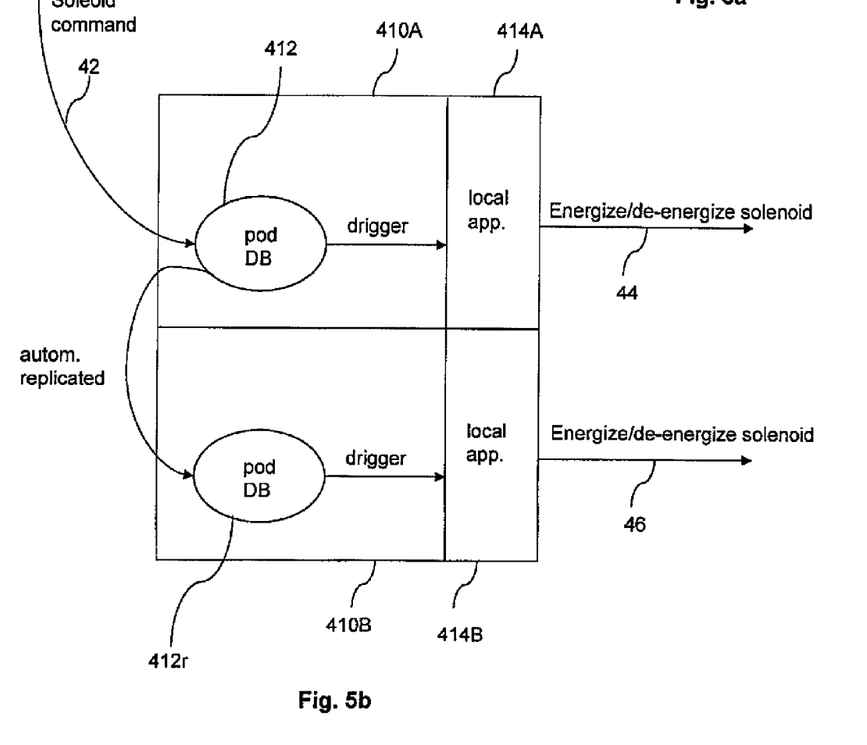

FIGS. 5a and 5b shows some example modes of operation of embodiments disclosed herein. In FIG. 5a, first local pod application 414A executing on primary subsea electronics module 410A of a subsea pods reads new BOP data 40. The first local pod application 414A then updates the new BOP data to the primary local pod database 412. The primary local pod database 412 is then responsible for duplicating the new entries to the replicate local pod database 412r. In FIG. 5b, the primary local pod database 412 has been updated via a communications network (e.g., 330 of FIG. 4) with solenoid commands 42 that may originate, for example, from the driller's panel (e.g., 320a in FIG. 4). This update is automatically replicated to the replicate local pod database 412r. The updates to the primary and the replicate local pod databases 412, 412r trigger the corresponding first and second local pod applications 414A, 414B to check the local pod databases 412, 412r for solenoid commands. The first local pod application 414A then executes the commands 44 on the primary subsea electronics module 410A, for example, in order to energize/de-energize solenoids. In selected embodiments, a standby subsea electronics module (e.g., 410B) may only execute commands when switched to primary mode. The switching to primary mode may be a manual operation, however it could be set to automatically occur upon failure of the original primary SEM (e.g., 410A).

Figure 6:
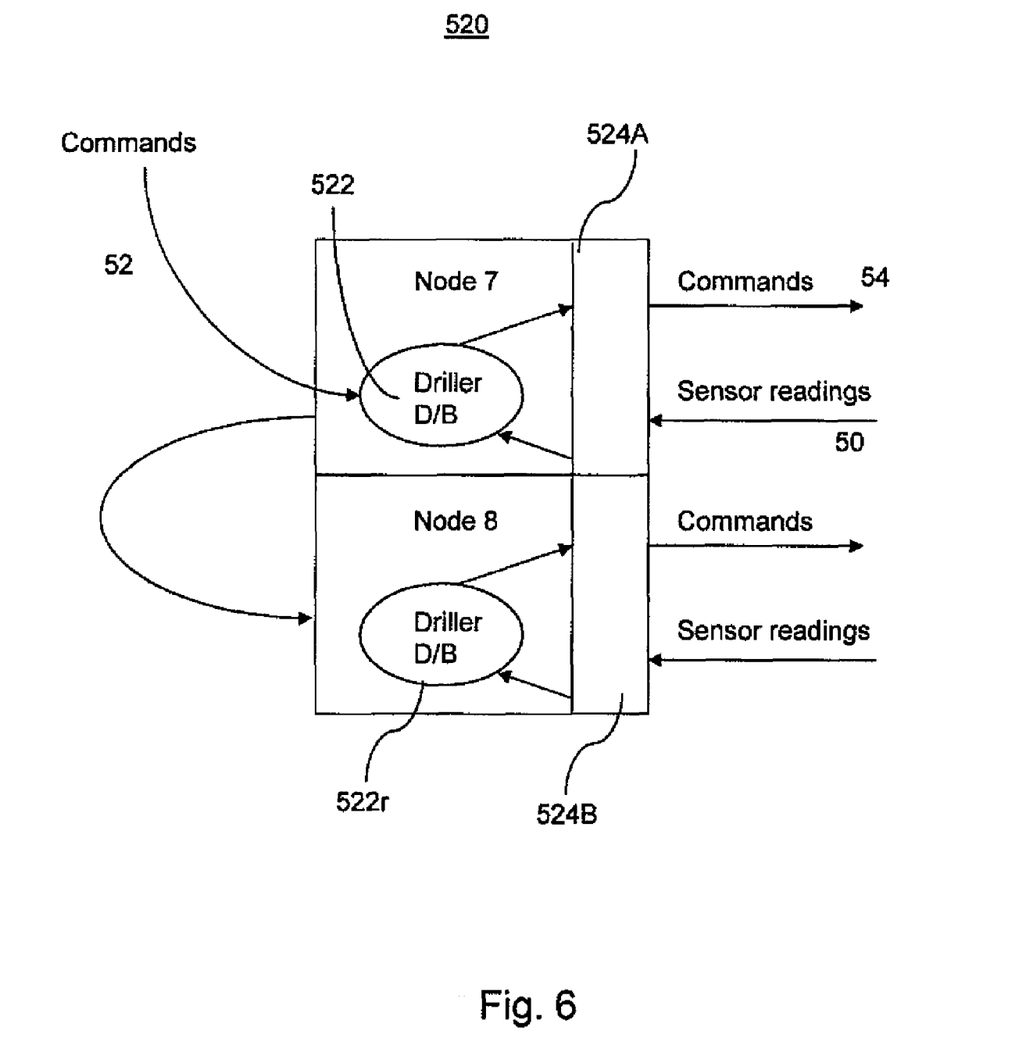
FIG. 6 shows a partial view of an example system in accordance with an embodiment of the present disclosure.

In another mode of operation, as shown in FIG. 6, a driller's panel 520 includes two nodes, similar to the primary and standby subsea electronics modules of the subsea pods. The first node includes a primary local driller database 522 and a first local driller application 542A. The second node includes a replicate local driller database 522r and a second local driller application 524B. The two nodes interface the same hardware. The primary local driller database 522 is updated via a communications network (e.g., 330 of FIG. 4) with commands 52. This update is automatically replicated to the replicate local driller database 522r. The updates to the primary and the replicate local driller databases 522, 522r trigger the corresponding first and second local driller applications 524A, 524B to check the local driller databases 522, 522r for commands 54 to be executed by the first and second local driller applications 524A, 524B. Simultaneously, the first and second local driller applications 524A, 524B read data 50, which may be sensor data such as temperature values. However, one skilled in the art would appreciate that the incoming data may not necessarily be provided to both of the two nodes. Rather, for example, each node may be responsible for receiving particular types of data, i.e., from various sensors or types of commands from a different local hardware database. For data incoming to the first node, the first local driller application 524A then updates the new data to the primary local driller database 522, which is then responsible for duplicating the new entries to the replicate local driller database 522r. The second local driller application 524B updates its newly received data to its local driller database 522r of the second node. In this case, the local driller database 522r of the second node operates in a primary mode, i.e., it is responsible for duplicating the new entries to the local driller database 522 of the first node. Thus, in selected embodiments, each node may communicate with any subsea electronics module (e.g., 410A, 410B of FIG. 5B) on any Pod as long as there exists a viable communication network connection.

Returning to FIG. 2, the operator's panel 220 and the central control unit 240 also each comprise a display database, i.e., an operator's panel display database 226 and a CCU display database 246, respectively. As such, every component of system 200 having a graphical user interface display may be associated with a display database. The display databases 226, 246 are updated, for example, with new BOP data, from any local hardware database. In operation, one of the display databases 226, 246 operates in a primary mode, i.e., it acts as a primary display database. When the local hardware database 212 is updated with a new entry of data from the blowout preventer, the local hardware database 212 automatically duplicates the entry to the primary display database (e.g., either 226 or 246), which is then responsible for updating the remaining display databases (e.g., the other of 226 and 246) with the new entry of data, i.e., the primary display database creates replicate display databases at one or more components having a graphical user interface display.

In one embodiment, the local hardware database (e.g., 212) updates the primary display database (e.g., 226) with new data entries from the blowout preventer. In such an embodiment, the local hardware database 212 may detect where in the system 200, i.e., on which of the operator's panel 220 and the central control unit 240 the primary display database resides. The local hardware database 212 then sends an update of data to the primary display database (e.g., either 226 or 246), which is in turn responsible for updating the remaining display databases (e.g., the other of 226 and 246).

While the updating of data to the primary display database is shown in FIG. 2 as being sent by local hardware databases 212, no limitation on the type of end device is intended in the scope of the present invention. Rather, any type of local hardware database 212 of any end device 210 may update the primary display database, including pods, hydraulic pumping units, diverters, etc.

Figure 7:
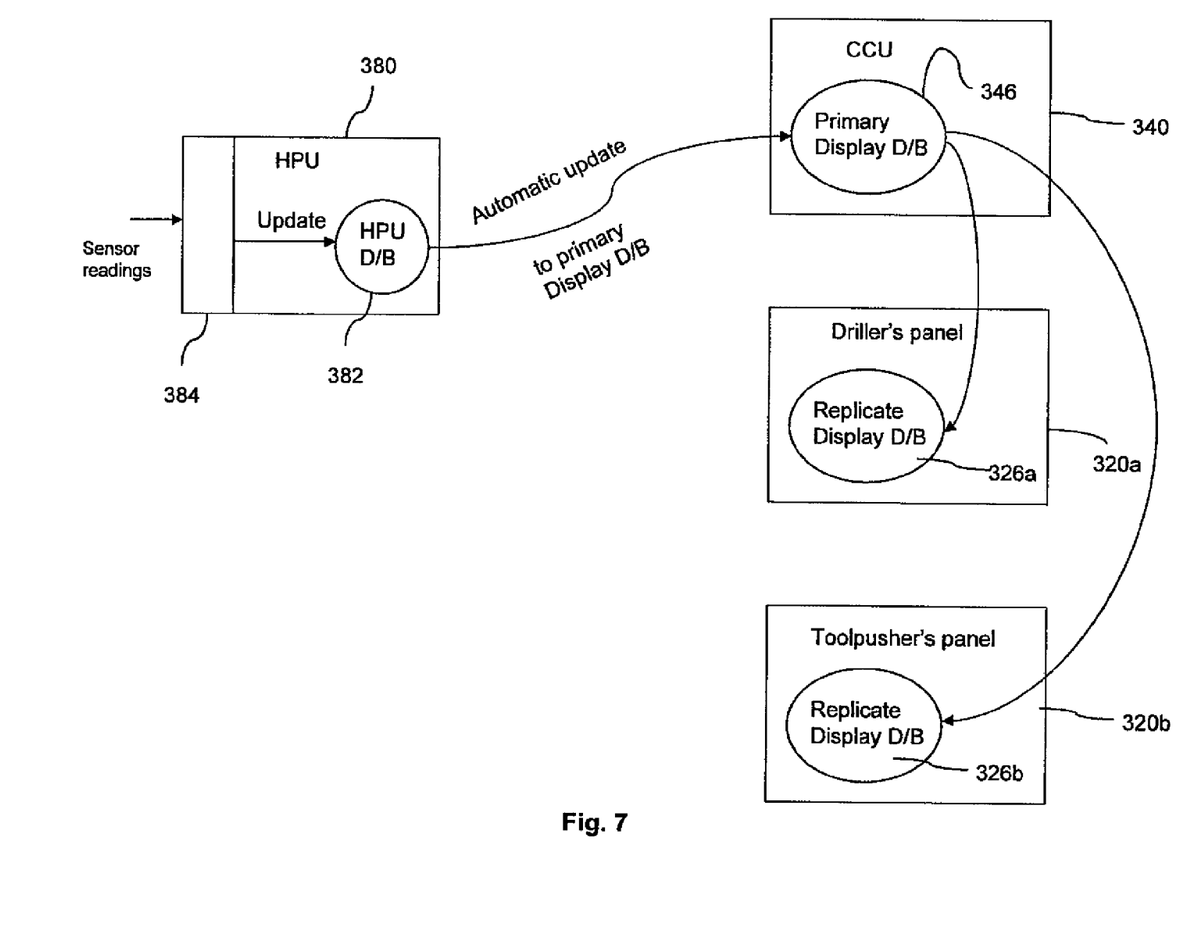
FIG. 7 shows a partial view of an example system in accordance with an embodiment of the present disclosure.

FIG. 7 shows an example mode of operation between a hydraulic pumping unit 380 as an end device with the central control unit 340 and operator's panels. As the hydraulic pumping unit 380 receives new HPU sensor readings, the local HPU application 384 updates the local HPU database 382. The local HPU database 382 is then responsible for duplicating the new entry to the primary display database. In the embodiment shown in FIG. 7, the primary display database 346 is located with the central control unit 340, i.e., the local CCU display database operates in the primary mode. The primary display database 346 then duplicates the new entry of data to the remaining display databases, i.e., the primary display database 346 creates replicate display databases 326a, 326b at the driller's panel 320a and at the toolpusher's panel 320b, respectively. Therefore, all graphical user interface displays in the system present the same information to all operators at all times. However, the present invention is not so limited. Rather, one skilled in the art would appreciate that in alternative embodiments, the primary display database may be located within the driller's panel, the toolpusher's panel, or any other system component having a graphical user interface display. Further, while this embodiment shows the update of data to the primary display database (and in turn remaining display databases) from an HPU, one skilled in the art would appreciate that data from other end devices may be updated to the primary display database in a similar manner. Additionally, for an end device that includes a local hardware database as well as a replicate local hardware database, one skilled in the art would appreciate that updates to the local hardware database would be replicated to the replicate local hardware database in addition to being updated to the primary display database and in turn to the remaining display databases.

Figure 8:
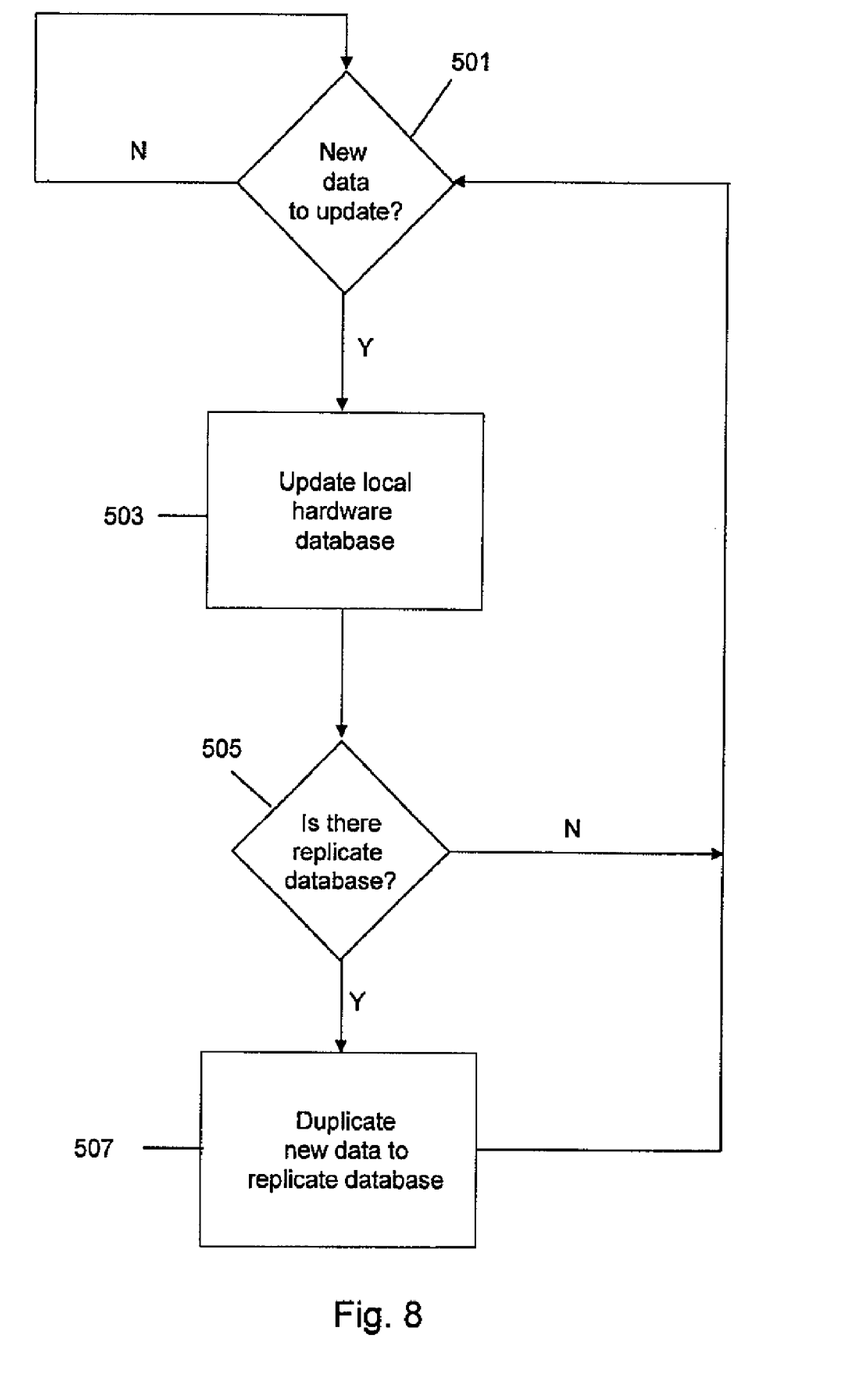
FIG. 8 shows a flowchart for a process in accordance with an embodiment of the present disclosure.

Referring now to FIG. 8, a flowchart showing the steps executed under the direction of a local application is presented. The steps may be executed by an end device (e.g., 210 of FIG. 2) on which the local application resides, such as the primary blue-pod subsea electronics module or the primary yellow-pod subsea electronics module. First, step 501 determines if there is any new data to update, for example, new data entries from a blowout preventer. If there is no new BOP data to update, step 501 is repeated until there is new BOP data to update. When there is new data to update, step 503 updates the local hardware database (e.g., 312 of FIG. 4), such as the local subsea electronics module database of the blue or the yellow pod. Next, step 505 determines if there is a replicate local hardware database (e.g., 312' of FIG. 4) corresponding to the local hardware database. If there is no replicate local hardware database, step 501 is executed again. If there is a replicate local hardware database, step 507 duplicates the new BOP data to the replicate local hardware database prior to execution of step 501. Furthermore, in selected embodiments, there may be more than on replicate database. Thus, step 505 may also check to see if there are any replicate databases and step 507 would duplicate new data to all replicate databases if there are more than one.

Figure 9:
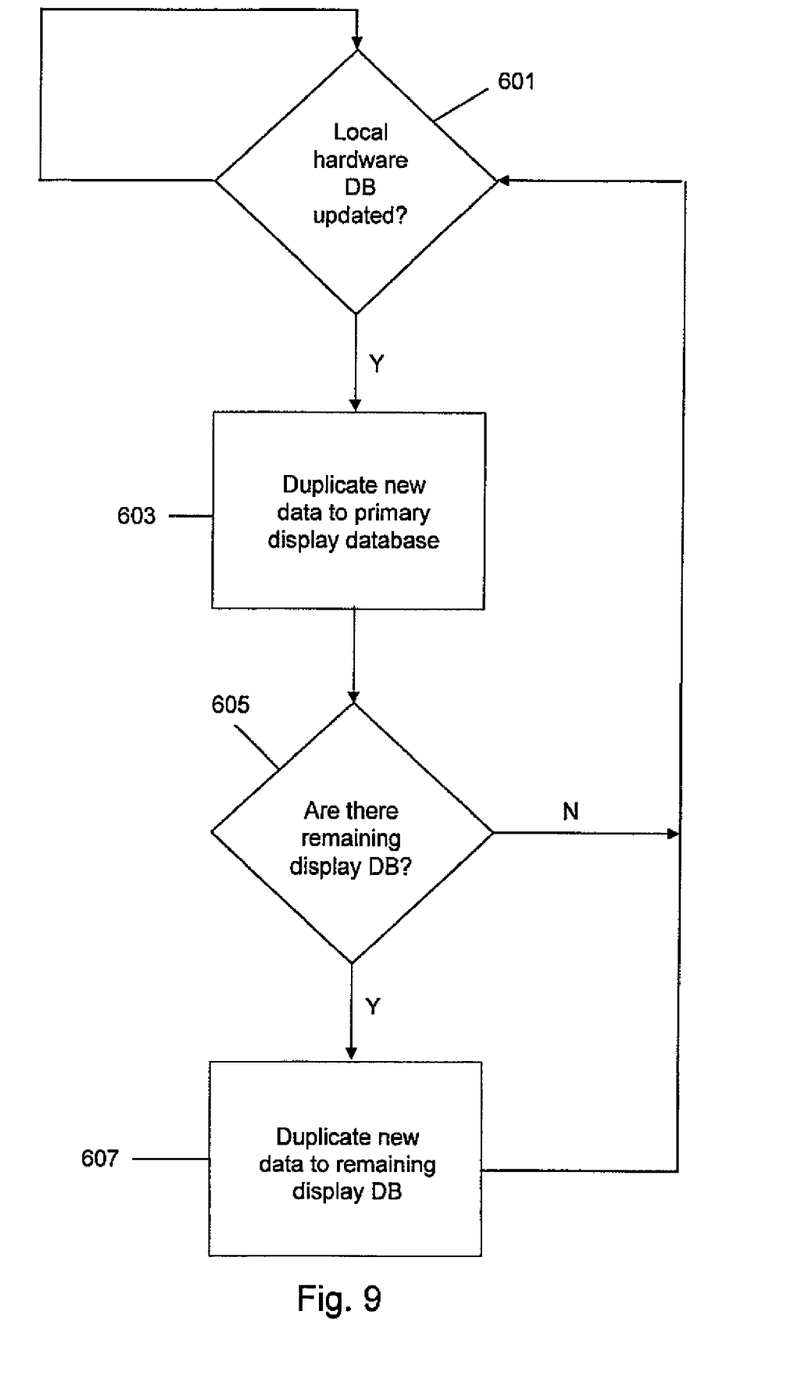
FIG. 9 shows a flowchart for a process in accordance with an embodiment of the present disclosure.

Referring now to FIG. 9, a flowchart showing the steps executed in order to duplicate the new BOP data to all the display databases is presented. First, step 601 determines whether the local hardware database (e.g., 312 of FIG. 4, or 382 of FIG. 5) of an end device (e.g., 310 of FIG. 4, or 380 of FIG. 5) has been updated with new entries of BOP data. If the local hardware database has not been updated, step 601 is repeated until the local hardware database is updated. When the local hardware database is updated, step 603 duplicates the new BOP data to the primary display database (e.g., 346 of FIG. 5). Next, step 605 determines whether there are remaining display databases (e.g., 326a and 326b of FIG. 5) in the system (e.g., 300 in FIG. 4a). If there are remaining display databases in the system, step 607 duplicates the new BOP data from the primary display database to the remaining display databases. The steps in FIG. 9 are preferably executed by a system controller, such as first system controller 240 or second system controller 250 of FIG. 2.

The invention described herein may be used with a variety of different systems. For example, the system may be used with any process control system that needs to update information remotely for either archival purposes and/or for retrieval from another remote system.

Advantageously, system and methods of the present disclosure may provide at least one of the following advantages. Because all the components of the control system (end devices, central control unit, operator's panels) include at least one local hardware database, the system does not need to include a unique binary flat file database system that is replicated throughout the system. Data updates and commands do not need to go through the central control unit of the system, which leads to a more efficient and streamlined system having a distributed real-time embedded database design. All data updates are made to the local hardware database that is concerned by the execution of the corresponding local application, and the local hardware database is responsible for automatically updating the corresponding replicate local hardware database, if any.

Additionally, all updates to a local hardware database are automatically updated to the primary display database, which in turn is responsible for updating the remaining display databases in the system. Primary and replicate databases are guaranteed to be consistent with each other. Therefore, local applications only have to interface to its local hardware and display databases, and the local databases are more closely matched to the local hardware. This simplifies all database interactions in the system, and renders the database system interaction less cumbersome.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. An apparatus to update data in a well control system, the apparatus comprising:
a central control unit in communication with a communications network, the central control unit comprising a first display database;
an end device in communication with the communications network, the end device comprising a local hardware database; and
an operator's panel in communication with the communications network, the operator's panel comprising a second display database;
wherein the local hardware database is configured to automatically update data to a primary display database designated from one of the first and the second display databases,
wherein the primary display database is configured to automatically update the data to the other of the first and the second display databases.

2. The apparatus according to claim 1, wherein the operator's panel comprises at least one of a driller's panel, a toolpusher's panel, and a subsea workshop panel.

3. The apparatus according to claim 1, wherein the end device comprises at least one of a subsea pod, a hydraulic pumping unit, and a diverter.

4. The apparatus according to claim 1, wherein the communications network comprises at least one of a local area network, a wide area network, and a wireless network.

5. The apparatus according to claim 1, wherein the central control unit comprises:
a first system controller comprising a primary local system controller database;
a second system controller comprising a replicate local system controller database;
a first communication controller comprising a primary local communication controller database;
a second communication controller comprising a replicate local communication controller database;
a first utility processor comprising a primary local utility processor database; and
a second utility processor comprising a replicate local utility processor database;
wherein each of the primary local databases is configured to automatically replicate data to the corresponding replicate local database.

6. The apparatus according to claim 1, wherein the end device further comprises a replicate local hardware database, wherein the local hardware database is configured to automatically update data to the replicate local hardware database.

7. An apparatus to update data from a blowout preventer, the apparatus comprising:
a central control unit in communication with a communications network and comprising a display database;
a subsea pod comprising a primary subsea electronics module comprising a primary local pod database and a standby subsea electronics module comprising a replicate local pod database;
wherein the primary and the standby subsea electronics modules are in communication with the communications network and the blowout preventer; and
an operator's panel in communication with the communications network, the operator's panel comprising a display database;
wherein the primary local pod database is configured to automatically replicate entries of data from the blowout preventer to the replicate local pod database; and
wherein the primary and the replicate local pod databases update entries of data to a primary display database;
the primary display database being one of the display databases of the central control unit and the operator's panel and being configured to automatically update the entries of data to the other of the display databases.

8. The apparatus according to claim 7, wherein the operator's panel comprises one of a driller's panel, a toolpusher's panel, and a subsea workshop panel.

9. The apparatus according to claim 7, wherein the blowout preventer comprises a subsea blowout preventer.

10. The apparatus according to claim 7, wherein the communications network comprises at least one of a local area network, a wide area network, and a wireless network.

11. An apparatus to update data from a blowout preventer, the apparatus comprising:
a central control unit in communication with a communications network and comprising a local CCU database and a CCU display database;
a first subsea pod and a second subsea pod, the first subsea pod and the second subsea pod each comprising:
a primary subsea electronics module comprising a primary local pod database, and
a standby subsea electronics module comprising a replicate local pod database,
wherein the first subsea pod and the second subsea pod are in communication with the communications network and the blowout preventer; and
a hydraulic pumping unit in communication with the communications network, the hydraulic pumping unit comprising a local HPU database;
a diverter in communication with the communications network, the diverter comprising a local diverter database;
a toolpusher's panel in communication with the communications network, the toolpusher's panel comprising a toolpusher's display database and a local toolpusher database; and
a driller's panel in communication with the communications network, the driller's panel comprising a driller's display database and a local driller database;
wherein one of the CCU display database, the toolpusher's display database, and the driller's display database operates as a primary display database;
wherein the primary local pod database is configured to automatically replicate entries of data from the blowout preventer to the replicate local pod database;
wherein the primary and the replicate local pod databases, the local CCU database, the local HPU database, the local diverter database, the local toolpusher database, and the local driller database each update entries of data to the primary display database, the primary display database being configured to automatically update the entries of data to the remaining display databases.

12. The apparatus according to claim 11, wherein the blowout preventer comprises a subsea blowout preventer.

13. The apparatus according to claim 11, wherein the communications network comprises at least one of a local area network, a wide area network, and a wireless network.

14. A method to update data from a blowout preventer, the method comprising:
connecting a central control unit comprising a first display database to a communications network;
communicating an end device comprising a local database with the communications network and the blowout preventer;
connecting an operator's panel comprising a second display database to the communications network;
designating one of the first and the second display databases as a primary display database;
updating the local hardware database with entries of data from the blowout preventer;
automatically updating the entries of data from the local hardware database to the primary display database through the communications network; and
automatically updating the entries of data from the primary display database to the other of the first and the second display databases.

15. The method according to claim 14, further comprising automatically updating the entries of data from the local hardware database to a replicate local hardware database of the end device.

16. A method to update data from a blowout preventer, the method comprising:
connecting the blowout preventer to a communications network;
connecting a central control unit to the communications network, the central control unit comprising a first display database and a first primary local hardware database;
communicating an end device comprising a local hardware database to the communications network and the blowout preventer;
connecting an operator's panel to the communications network, the operator's panel comprising a second display database and a second primary local hardware database;
designating one of the first and the second display databases as a primary display database;
designating one of the first and the second primary local hardware databases as a designated database;
updating the designated database with entries of data from the blowout preventer;
automatically updating the entries of data from the designated database to the local hardware database of the end device;
automatically updating the entries of data from the local hardware database of the end device to the primary display database; and
automatically updating the entries of data from the primary display database to the other of the first and the second display databases.

17. The method of claim 16, further comprising automatically replicating the designated database to a corresponding replicate local hardware database.

* * * * *